United States Patent
Prakash et al.

(10) Patent No.: US 9,087,045 B2
(45) Date of Patent: Jul. 21, 2015

(54) METHODS AND SYSTEMS FOR REAL TIME LANGUAGE TRANSLATION USING SOCIAL NETWORKING

(75) Inventors: Gyan Prakash, Beaverton, OR (US); Selim Aissi, Beaverton, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 829 days.

(21) Appl. No.: 12/625,119

(22) Filed: Nov. 24, 2009

(65) Prior Publication Data

US 2011/0125485 A1   May 26, 2011

(51) Int. Cl.
*G06F 17/28*   (2006.01)
*G06Q 10/10*   (2012.01)

(52) U.S. Cl.
CPC ............... *G06F 17/28* (2013.01); *G06Q 10/10* (2013.01)

(58) Field of Classification Search
CPC ....... G06Q 50/01; G06F 17/289; G06F 17/28; G06F 17/2854; G06F 17/27
USPC .................................. 704/277, 2, 4
See application file for complete search history.

(56) References Cited

U.S. PATENT DOCUMENTS

| | | | | |
|---|---|---|---|---|
| 5,495,413 | A * | 2/1996 | Kutsumi et al. .................... 704/4 |
| 6,738,053 | B1 * | 5/2004 | Borgstrom et al. ............ 345/179 |
| 7,933,965 | B2 * | 4/2011 | Bonar et al. .................... 709/208 |
| 8,032,355 | B2 * | 10/2011 | Narayanan et al. ................ 704/2 |
| 8,170,897 | B1 * | 5/2012 | Cohen et al. ................. 705/7.13 |
| 8,548,795 | B2 * | 10/2013 | Anisimovich et al. ............ 704/4 |
| 2002/0112014 | A1 * | 8/2002 | Bennett et al. ................. 709/206 |
| 2003/0009320 | A1 * | 1/2003 | Furuta ................................ 704/2 |
| 2003/0182420 | A1 * | 9/2003 | Jones et al. .................... 709/224 |
| 2004/0102956 | A1 * | 5/2004 | Levin ................................ 704/2 |
| 2004/0102957 | A1 * | 5/2004 | Levin ................................ 704/3 |
| 2004/0205334 | A1 * | 10/2004 | Rennels ........................ 713/154 |
| 2005/0004840 | A1 * | 1/2005 | Wanninger ...................... 705/14 |

(Continued)

FOREIGN PATENT DOCUMENTS

CN   1301118 A   6/2001
CN   1707476 A   12/2005

(Continued)

OTHER PUBLICATIONS

Office Action Received for Japanese Patent Application No. 2010-209896, mailed on May 8, 2012, 2 pages of Office Action and 2 page of English Translation.

(Continued)

*Primary Examiner* — Michael N Opsasnick
(74) *Attorney, Agent, or Firm* — Garrett IP, LLC (57) ABSTRACT

Methods and systems with which a language translation may be obtained. An originator may request a translation by sending the passage to be translated to a server. The server may then broadcast the passage to prospective translators. In an embodiment, the translators may be connected to the originator and/or each other through a social network. Some or all of the prospective translators then return translations of the passage to the originator, via the server. The originator may then select the most desirable translation and inform the server. In an embodiment, the provision of the translation service may be part of an exchange or barter transaction. The server may apply a credit to the translator of the chosen translation. The translator may then use the credit in a subsequent trade or other transaction.

24 Claims, 10 Drawing Sheets

(56) References Cited

U.S. PATENT DOCUMENTS

| | | | |
|---|---|---|---|
| 2006/0206310 A1* | 9/2006 | Ravikumar et al. | 704/9 |
| 2008/0177528 A1* | 7/2008 | Drewes | 704/2 |
| 2009/0007245 A1* | 1/2009 | Schultz | 726/5 |

FOREIGN PATENT DOCUMENTS

| | | |
|---|---|---|
| CN | 1869975 A | 11/2006 |
| JP | 10275157 A | 10/1998 |
| JP | 2002-244884 A | 8/2002 |
| JP | 2004-507799 A | 3/2004 |
| JP | 2004-118720 A | 4/2004 |
| JP | 2006-139577 A | 6/2006 |
| JP | 2007-179513 A | 7/2007 |
| JP | 2008-090709 A | 4/2008 |
| JP | 2009053761 A | 3/2009 |
| JP | 2009-157882 A | 7/2009 |
| JP | 2011-507079 A | 3/2011 |
| KR | 2003-0027996 A | 4/2003 |
| KR | 2003-0084294 A | 11/2003 |
| KR | 2009-0089522 A | 8/2009 |
| WO | 00/57320 A2 | 9/2000 |
| WO | 2009/073856 A1 | 6/2009 |

OTHER PUBLICATIONS

"Notice from the European Patent Office dated Oct. 1, 2007 concerning business methods." Official Journal of The European Patent Office. vol. 30(11), XP007905525, ISSN: 0170-9291, Nov. 1, 2007, pp. 592-593.

Extended European Search Report received for EP Application No. 10251642.4, mailed on Nov. 25, 2010, 6 pages.

Office Action Received for Korean Patent Application No. 10-2010-92880, mailed on May 22, 2012, 6 pages of Office Action and 7 pages of English Translation.

Office Action received for Japanese Patent Application No. 2010-209896, mailed on Jan. 22, 2013, 2 pages of English Translation and 2 pages of Japanese Office Action.

Office Action received for Japanese Patent Application No. 2010-209896, mailed on Jul. 30, 2013, 4 Pages of Office Action Including 2 page of English Translation.

Office Action Received for Korean Patent Application No. 10-2010-92880, mailed on Mar. 29, 2013, 6 pages of Office Action including 3 pages of English Translation.

Chinese Office Action Received Chinese Patent application No. 201010293632.3, mailed on Dec. 19, 2012. 23 pages of Office Action including 1 page of search report and 14 pages of English Translation.

Office Action received for Chinese Patent Application No. 201010293632.3, mailed on Aug. 30, 2013, 22 pages of English Translation and 10 pages of Chinese Office Action.

Office Action received for Chinese Patent Application No. 201010293632.3, mailed on Mar. 4, 2014, 22 pages of English Translation and 9 pages of Chinese Office Action.

Office Action received for Chinese Patent Application No. 201010293632.3, mailed on Sep. 10, 2014, 32 pages of Office Action including 23 pages of English Translation.

\* cited by examiner

METHODS AND SYSTEMS FOR REAL TIME LANGUAGE TRANSLATION USING SOCIAL NETWORKING

BACKGROUND

Understanding spoken or written words in a foreign language is an ancient problem. Whether in a professional, academic, or social setting, the inability to understand a language impedes progress and forecloses relationships.

Current solutions to this problem can be slow, expensive, and ineffective. Mastering a language may take years of study, represents a huge investment, and therefore may not be a practical solution. Another possibility is to manually look up the translations of individual words or phrases. This can be clumsy at best and inaccurate at worst. Resources are required, perhaps a phrasebook or access to an online dictionary. Such an approach is slow and tedious, as well as being mistake prone. Moreover, this approach may require some background knowledge on the part of the user. A word-for-word translation of a passage may not be meaningful without some knowledge of the foreign grammar. In addition, a lookup process may not be possible if the alphabet is foreign, as in the case of the Cyrillic alphabet, or if the language is character based, as in the case of Japanese. Machine-based solutions have been proposed but they tend to be crude and inaccurate, in part because of the well known difficulties of automating natural language processing.

In short, translating a foreign language may be costly while being potentially inaccurate. The required expenditure in time and effort may be significant, and the results returned may not be reliable. This disparity is even greater when the passage to be translated is a brief passage. Significant work may be required to translate even a single paragraph or sentence.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems with which a language translation may be obtained. An originator may request a translation by sending the passage to be translated to a server. The server may then broadcast the passage to prospective translators. In an embodiment, the translators may be connected to the originator and/or each other through a social network. Some or all of the prospective translators then return translations of the passage to the originator, via the server. The originator may then select the most desirable translation and inform the server. In an embodiment, the provision of the translation service may be part of an exchange or barter transaction. The server may apply a credit to the translator of the chosen translation. The translator may then use the credit in a subsequent trade or other transaction.

Figure 1:
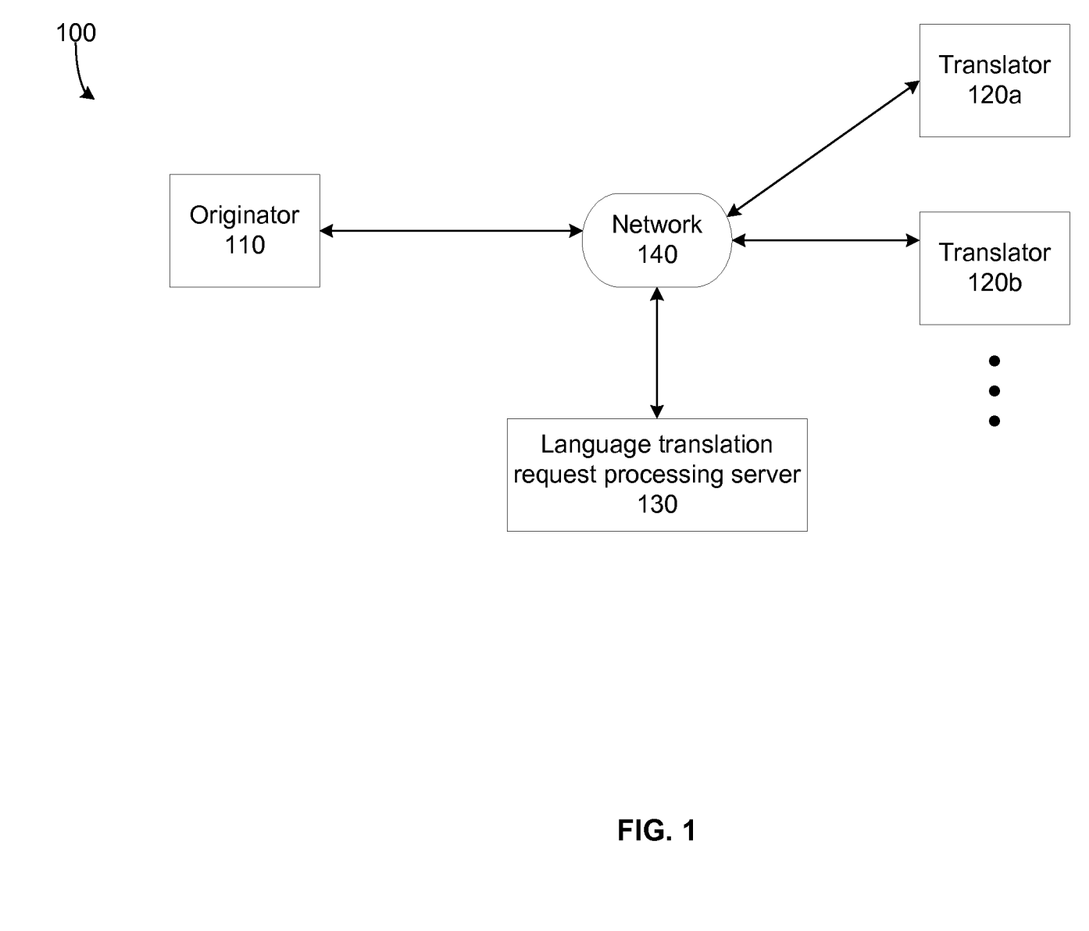
FIG. 1 is a block diagram generally illustrating the system described herein, according to an embodiment.

An embodiment of the system described herein is shown generally in FIG. 1. System 100 may provide for communications between an originator communications device 110 and the communications devices of one or more prospective translators 120, via a language translation request processing server 130 and a network 140, but is not limited to these components. Note that while two translator communications devices are shown, it is to be understood that this is not a limitation, and that any number of translator communications devices may be present.

The communications device of the originator 110 may create a translation request and send it to language translation request processing server 130. The translation request may include the text or audio that needs to be translated. The server 130 may then construct a request broadcast based on the translation request, and send the request broadcast to communications devices of the respective translators 120. After one or more of the translators performs the translation, the translations may be returned to the server 130, which may then pass the translations to the mobile communications device of originator 110. In the illustrated embodiment, the communications between the originator communications device 110, translator communications devices 120, and server 130 may take place via a communications network 140.

In alternative embodiments, there may not be a need for the server 130 to contact prospective translators 120. Frequently requested translations may be cached at the server 130. If, for example, the passage to be translated has frequently been the subject of previously requested translations, previous translations of the passage may be saved in a cache at server 130. In this case, the server may first see if the requested translation exists in its cache, and if so, may directly respond to the originator 110 with the one or more of the cached translations. Alternatively, the server may have functionality that allows translation to be performed in an automated manner at the server using a stored digital dictionary. Again, this latter embodiment may be feasible when the passage contains frequently used words and phrases.

In an embodiment, network 140 may include the Internet, one or more wide area networks, one or more local area networks, or some combination thereof. The communications may take the form of short messaging system (SMS) and/or multi-media messaging system (MMS) messages.

Figure 2:
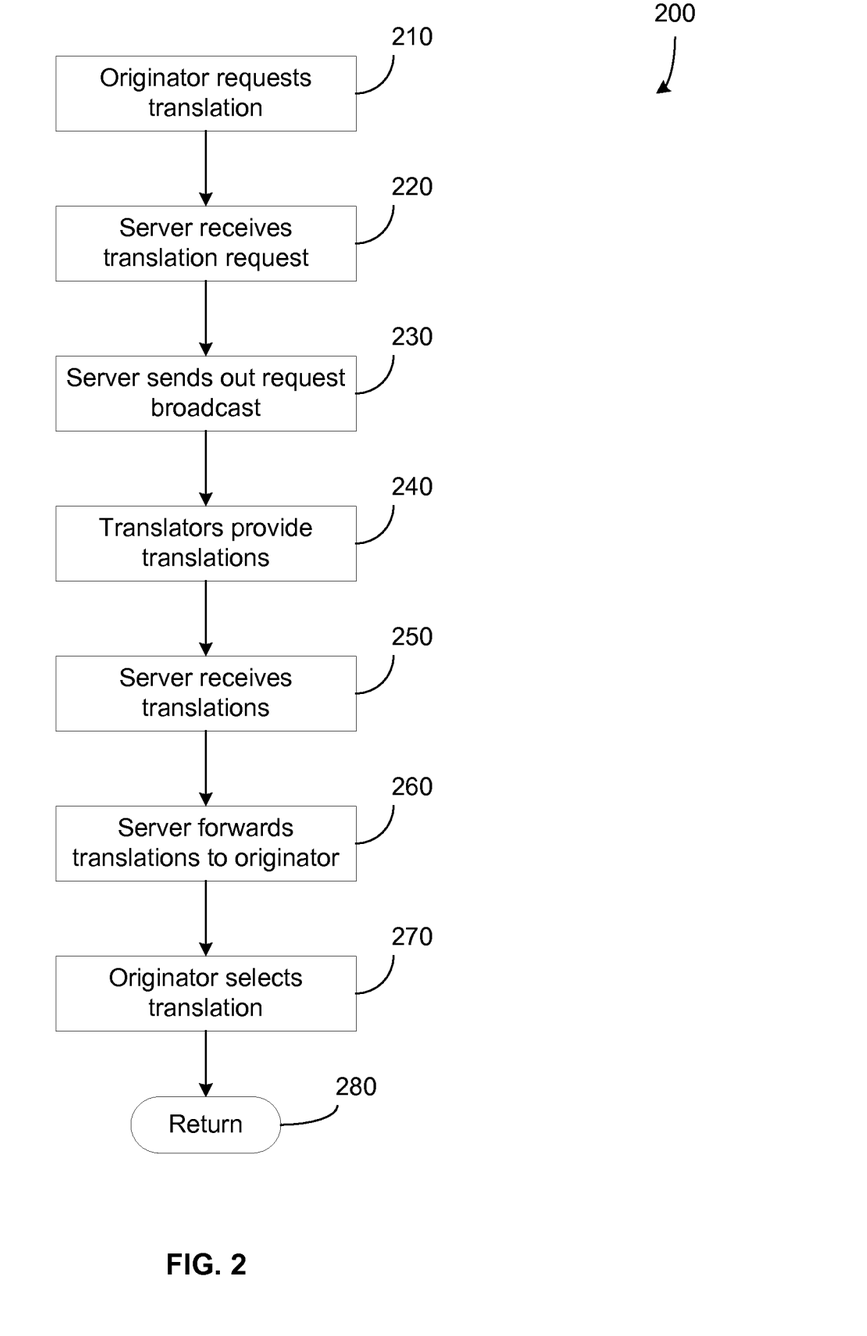
FIG. 2 is a flowchart generally illustrating the processing described herein, according to an embodiment.

The processing of system 100 is described in flowchart 200 of FIG. 2, according to an embodiment. At 210, the originator may request a translation via his communications device. This may be accomplished by providing text or audio to the server in the form of a translation request. At 220, this request may be received at the server. After processing the translation request in a manner described below, the server may send out a request broadcast at 230 to communications devices of prospective translators. At 240, after performing the translation, the translators may provide these translations to the server. At 250, the server receives the translations. At 260, the translations may be forwarded to the communications device of the originator. If there are two or more translations, the originator may evaluate them and select a favored translation at 270. In an embodiment, the originator may also inform the server of the chosen translation, and the server may then award a credit to the responsible translator. The credit may be used by the translator in a subsequent transaction, such as a trade or barter for example. The process may conclude at 280.

Figure 3:
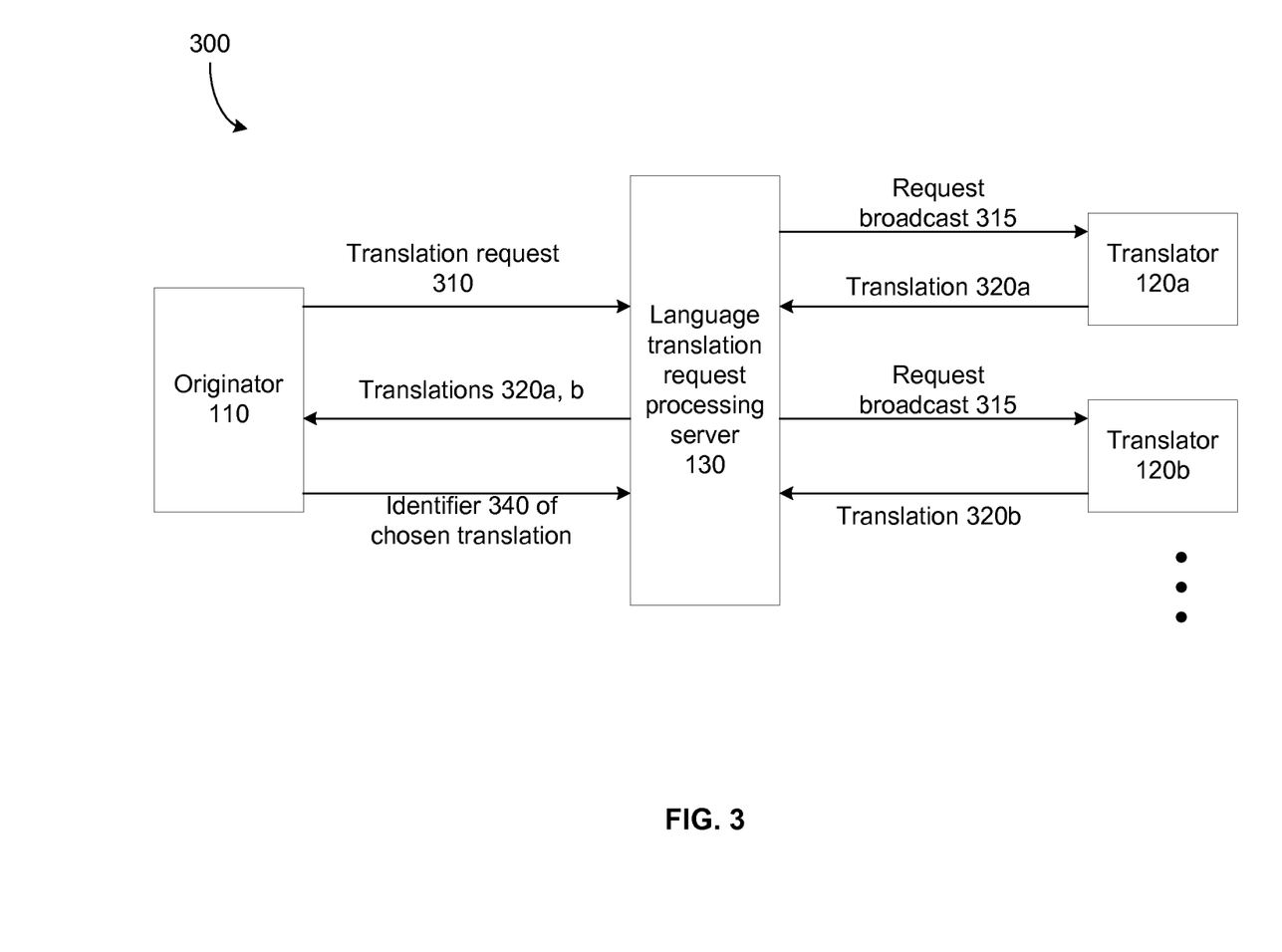
FIG. 3 is a block diagram illustrating operation of the system described herein, according to an embodiment.

The processing of an embodiment is shown in greater detail as system 300 of FIG. 3. As in FIG. 1, system 300 may include the originator communications device 110, the language translation request processing server 130, and translators' communications devices 120, but is not limited to these components. Communications between these entities may take place via a network 140, although such a network is not shown in FIG. 3 for the sake of simplicity.

Originator communications device 110 may send a translation request 310 to server 130. Originator communications device 110 may be a mobile communications device, such as a smart phone or other mobile internet device, for example. In an embodiment, the translation request 310 may have been constructed using a template or form that is included in an application running on the originator communications device 110. Such a form may ask for the language desired, for example, and may include the text or audio to be translated. Alternatively, the text or audio to be translated may be attached to the form. The translation request 310 may include the completed form with the text or audio, and may be sent to the server 130 as one or more SMS or MMS messages.

The server 130 may then receive the translation request 310. In an embodiment, the translation request 310 may have to be authenticated by the server 130. The translation request may, for example, be accompanied by a digital signature. Such a signature may be cryptographically based using public key or symmetric key technology, for example, and would have to be verified by server 130 before processing may continue.

In an embodiment, the server 130 may parse the translation request 310 in order to detect any abusive or inappropriate language. This may be performed, for example, using a dictionary lookup process in order to identify questionable words or phrases. If such language is found, the translation request 310 may be denied by server 130. If no such language is found, the server 130 may construct a request broadcast 315 on the basis of the translation request 310. The request broadcast 315 is then sent out to each of one or more communications devices of prospective translators 120. In an embodiment, the set of translators may have been identified in translation request 310. Alternatively, the set of translators may have been predetermined and their identities stored at server 130. The translators may be associated with the originator 110 through a social networking service such as LinkedIn or Facebook for example, and/or may be associated with a particular language. In an embodiment, the server 130 may derive the list of prospective translators 120 through a search of a social network of the originator. Such a search may be performed upon receipt of the translation request 130, or may have been done in advance.

Each translator communications device 120 may then return a translation 320 to the server 130. The returned translations 320 may each include audio data representing the translation. In an embodiment, server 130 may parse some or all of translations 320 in order to determine whether they contain anything abusive, offensive, or otherwise inappropriate. Inappropriate translations may be deleted. In an embodiment, the translations 320 that survive this parsing process may then be sent to originator communications device 110 as one or more MMS messages.

The originator may then evaluate the translations 320 and choose a preferred translation. In the illustrated embodiment, an identifier 340 of the chosen translation is sent back to server 130. The server 130 may then use identifier 340 to identify the responsible translator. This translator may then be granted credit that may later be used in another transaction, such as a trade or barter transaction for example, with the originator or with another party.

Figure 4:
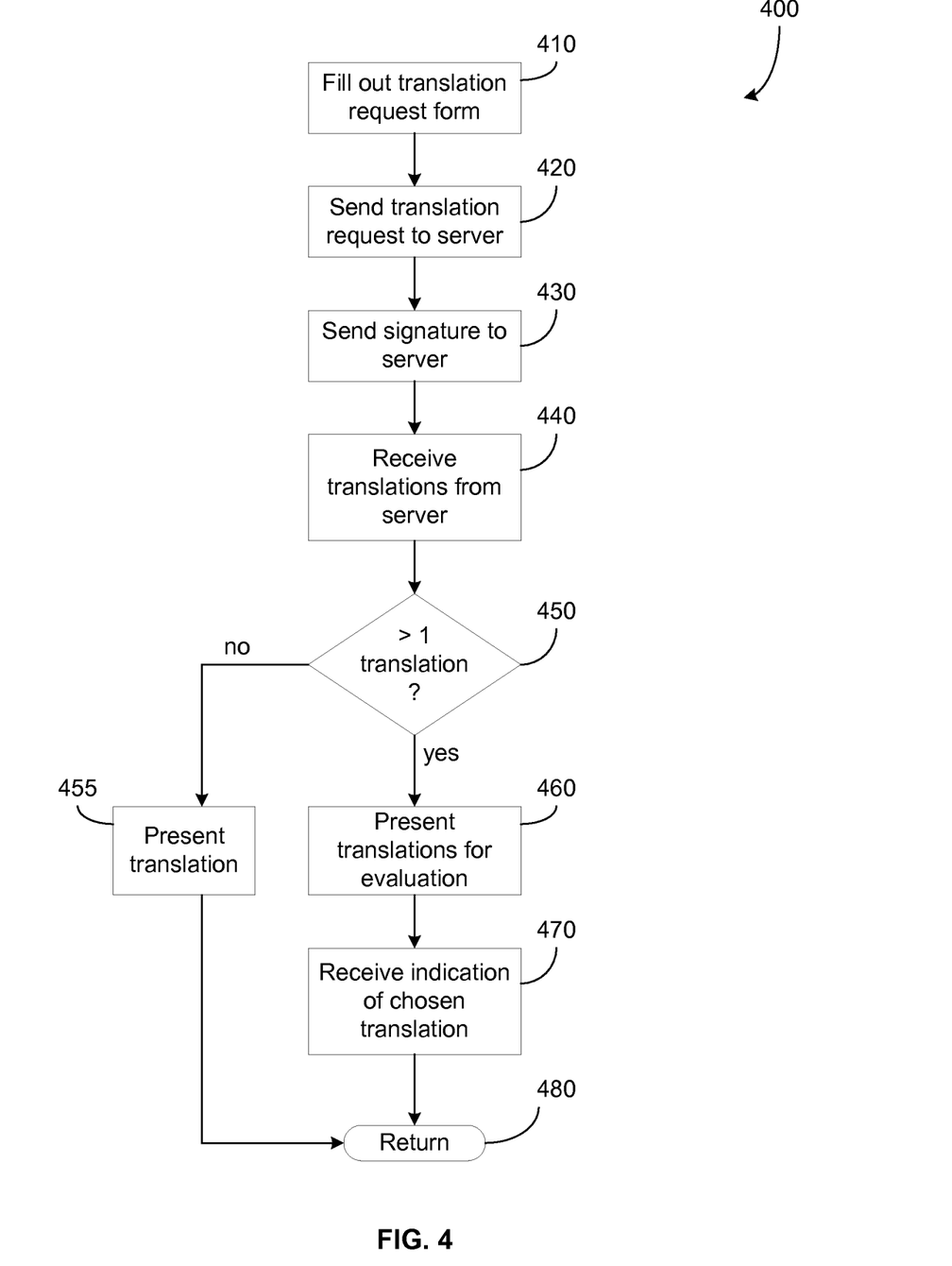
FIG. 4 is a flowchart illustrating the processing described herein from the perspective of the originator of a translation request, according to an embodiment.

The processing performed at the originator is shown in FIG. 4 as process 400, according to an embodiment. At 410, the originator may construct a translation request. In the illustrated embodiment, this may be performed by completing a template or form in an application running on the communications device of the originator. At 420, the translation request may be sent to the server as one or more SMS and/or MMS messages. The translation request may include text or audio data, or both. In an embodiment, the translation request may also include a digital signature for authentication purposes, as indicated at 430.

At 440, the originator communications device may receive translation(s) from the server. In an embodiment, the translations are received as one or more MMS messages. If, at 450, it is determined that there are more than one translations received, then at 460 the translations are presented to the originator via his communications device. This allows the originator to evaluate the different translations. The originator may then choose a translation through his communications device; this input may be received by a user interface of the communications device at 470. In an embodiment, this indication may result in a communication being sent back to the server, identifying the chosen translation. If, at 450, it is determined that there is only one translation available, then there is no need for evaluation, and the sole translation may be presented to the originator at 455. The process concludes at 480.

The logic described above with respect to FIG. 4 may be implemented as hardware, firmware, or software, or any combination thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 5:
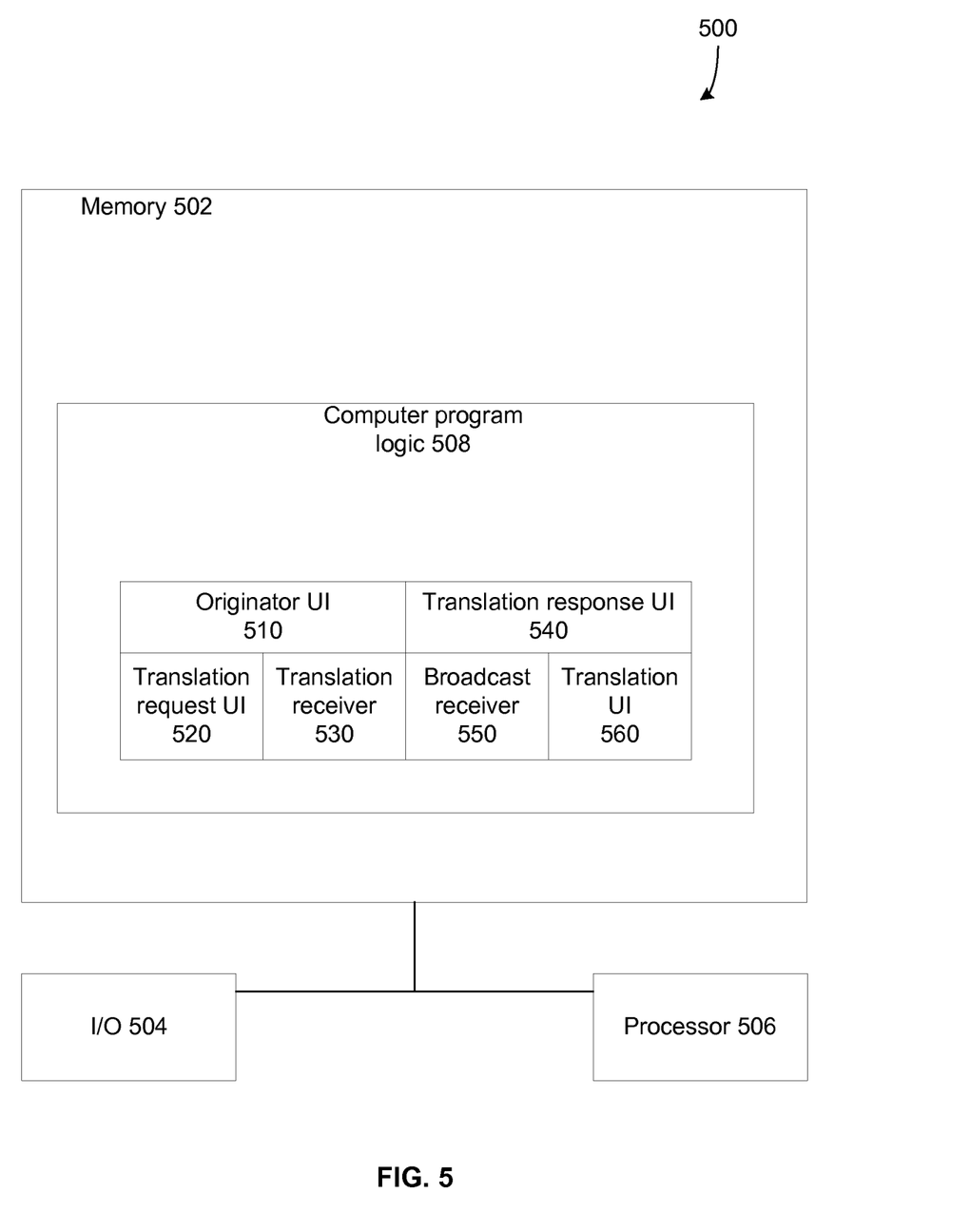
FIG. 5 is a block diagram illustrating software components in a communications device used by the originator, in an embodiment.

FIG. 5 illustrates a software or firmware embodiment of the logic of FIG. 4. System 500 may be incorporated in a communications device of the originator, such as a smart phone or other mobile internet device for example. System 500 may include one or more memory components 502 in communication with a processor 506 and one or more input/output devices or ports, shown collectively as I/O, but is not necessarily limited to these components.

Memory 502 may store instructions for execution by processor 506, along with additional related data. Memory 502 may be implemented on a computer readable medium, as would be understood to a person of ordinary skill in the art. Such a medium may be, for example and without limitation, a non-volatile memory device, a hard drive, a compact disk that may be read by a compact disk drive, an integrated circuit, or other machine-readable memory device. The executable instructions are shown as computer program logic 508. Computer program logic 508 may include several modules, shown as modules 510-560, but is not necessarily limited to these modules. These may include an originator user interface (UI) 510 that presents the originator with input options, receives such inputs, and presents data to the originator. The originator's inputs may be used by a translation request UI 520 to formulate a translation request that can ultimately be sent to the server. The inputs in this case may include an indication of the text or audio data that is to be translated. A translation receiver module 530 may be responsible for receiving translations and presenting them to the originator. Selection of a particular translation may be made by the originator through originator UI 510.

In the illustrated embodiment, system 500 includes functionality that may be used by a translator, in addition to the logic described above for an originator. A single communications device may, in this case, be usable by both kinds of users. The computer program logic modules 540-560 related to translator operations will be described in greater detail below.

Figure 6:
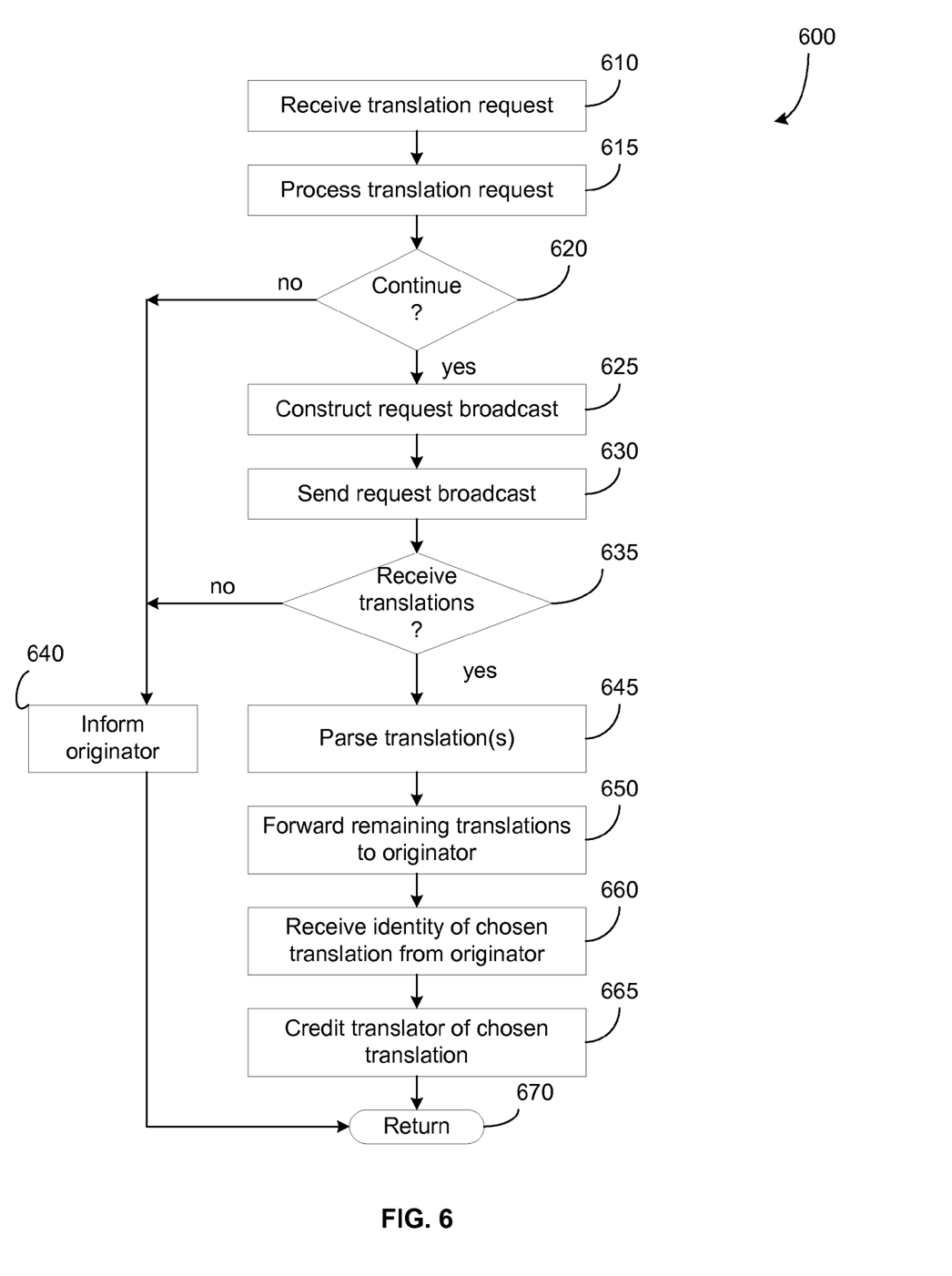
FIG. 6 is a flowchart illustrating the processing described herein from the perspective of a server, according to an embodiment.

In an embodiment, the processing at the server may take place as shown in FIG. 6, process 600. At 610, the server may receive a translation request from an originator communications device. As noted above, the translation request may be one or more SMS or MMS messages, and may include the passage to be translated in text or audio form. At 615, the translation request may be processed by the server. This may include parsing, authentication, and other administrative functions, as will be discussed in greater detail below with respect to FIG. 7. Depending on the outcome of the processing of 615, a determination may be made at 620 as to whether to continue. If so, the process 600 may continue at 625; otherwise, the originator may be informed at 640 that processing is stopping, and process 600 may conclude at 670.

In an embodiment, the processing of 615 may reveal that the passage to be translated has already been translated, perhaps for another originator. The previous translation may have been cached at the server. In such an embodiment, one or more such cached translations for this passage may be sent to the originator, without any solicitation of prospective translators. Alternatively, the server may also have functionality that allows translation to be performed in an automated manner at the server using a stored digital dictionary or other form of collected previous translations. Again, this latter embodiment may be feasible when the passage contains frequently used words and phrases.

At 625, the server may construct a request broadcast on the basis of the received translation request. At 630, the request broadcast may be sent to communications devices of a respective set of prospective translators. At 635, it may be determined whether or not any translations have been received from the translators. If not, then the originator may be so informed at 640, and the process concludes. If one or more translations are received, then processing may continue at 645. In an embodiment, the translations may be in the form of MMS messages that include audio data. At 645, the translations may be parsed in order to determine if any abusive or other offensive language is present. Such translations may be deleted, and at 650, the remaining translations may be forwarded to the originator.

In the illustrated embodiment, at 660 the server may receive from the originator an identifier of the chosen translation. At 665, the server may award credit to the translator responsible for the chosen translation. The process may conclude at 670.

Figure 7:
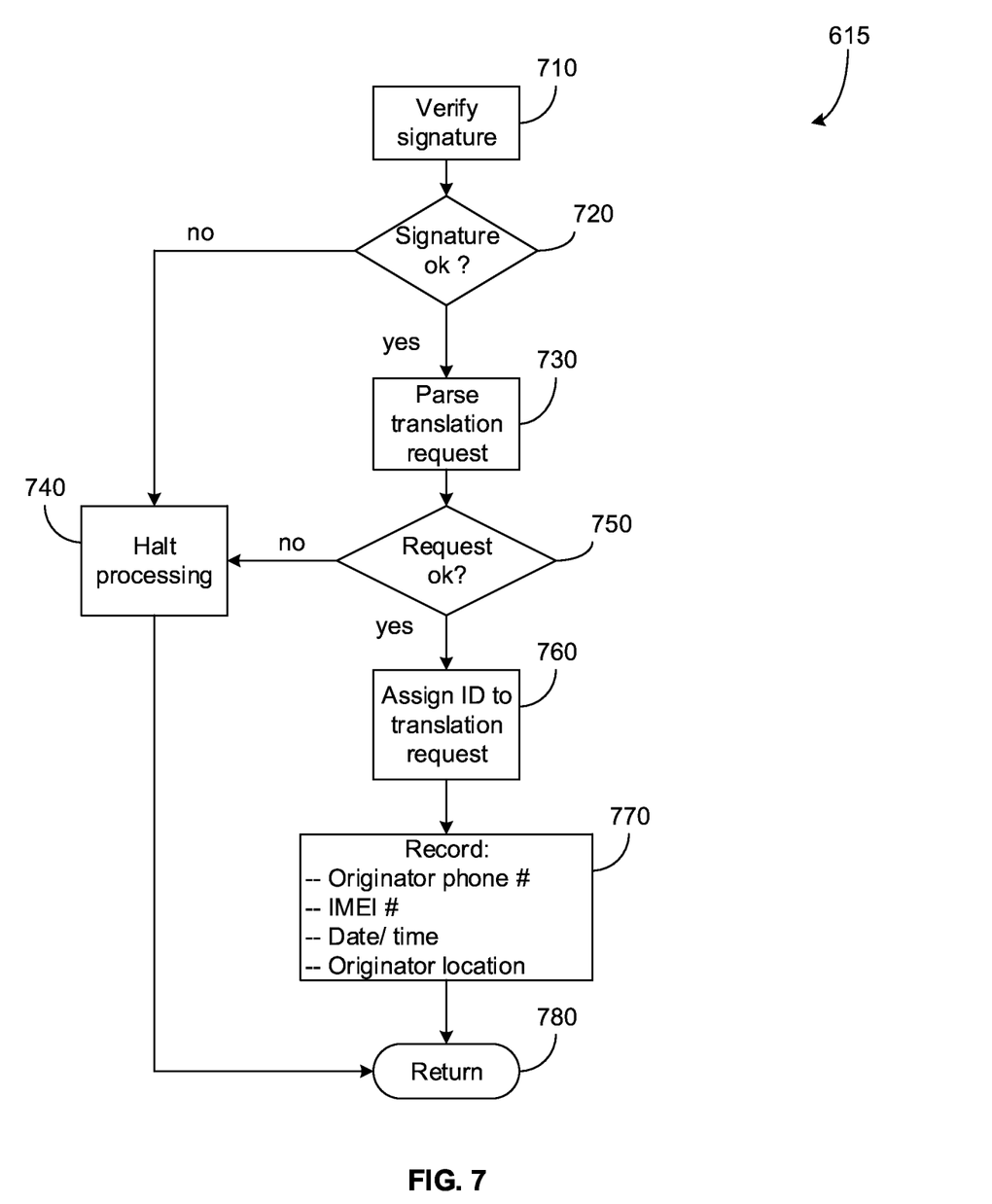
FIG. 7 is a flowchart illustrating processing of a translation request at the server, according to an embodiment.

The processing of the translation request (615 of FIG. 6) is illustrated in greater detail in FIG. 7, according to an embodiment. At 710, the signature accompanying the translation request may be verified in order to authenticate the originator. The signature and verification processes may be cryptographically based and may utilize public key or symmetric key cryptography. At 720, a determination is made as to whether verification was successful. If not, processing may be stopped at 740. A decision may then be made at 620 (see FIG. 6) to not continue, and to inform the originator at 640.

Otherwise, the process may continue at 730, where the translation request may be parsed. The server may parse the translation request in order to determine whether it contains any language that may be considered abusive or offensive. In an embodiment, this may be accomplished by using a stored dictionary of relevant words or phrases, and by looking up words as they are parsed. At 750, a determination may be made as to whether any such language is present. If such language is present, then the translation request is not approved, and processing halts at 740. Referring to FIG. 6, a determination may then be made at 620 to not continue.

If the translation request is approved, then processing may continue at 760. Here, an identifier may be attached to the translation request. At 770, a variety of data relating to the translation request may be recorded. This data may include the phone number of the originator, the international mobile equipment identity (IMEI) number of the originator's communications device, the date and time of the request, and the location of the originator. This information may be used when the server forwards any translations back to the originator. The process may conclude at 780.

In an alternative embodiment, the originator may not be the only party who evaluates translations. Here, translations may be open for inspection by other parties who may log on to the server and who may then review previous translations. These third parties may then grade or rank the translations, or provide their own. A subsequent originator may then take advantage of these evaluations to either select a translator, or to choose a translation if the passage in question has been previously translated, cached, and graded at the server. These evaluations may also be used in determining the amount of credit to be granted to a translator.

Figure 8:
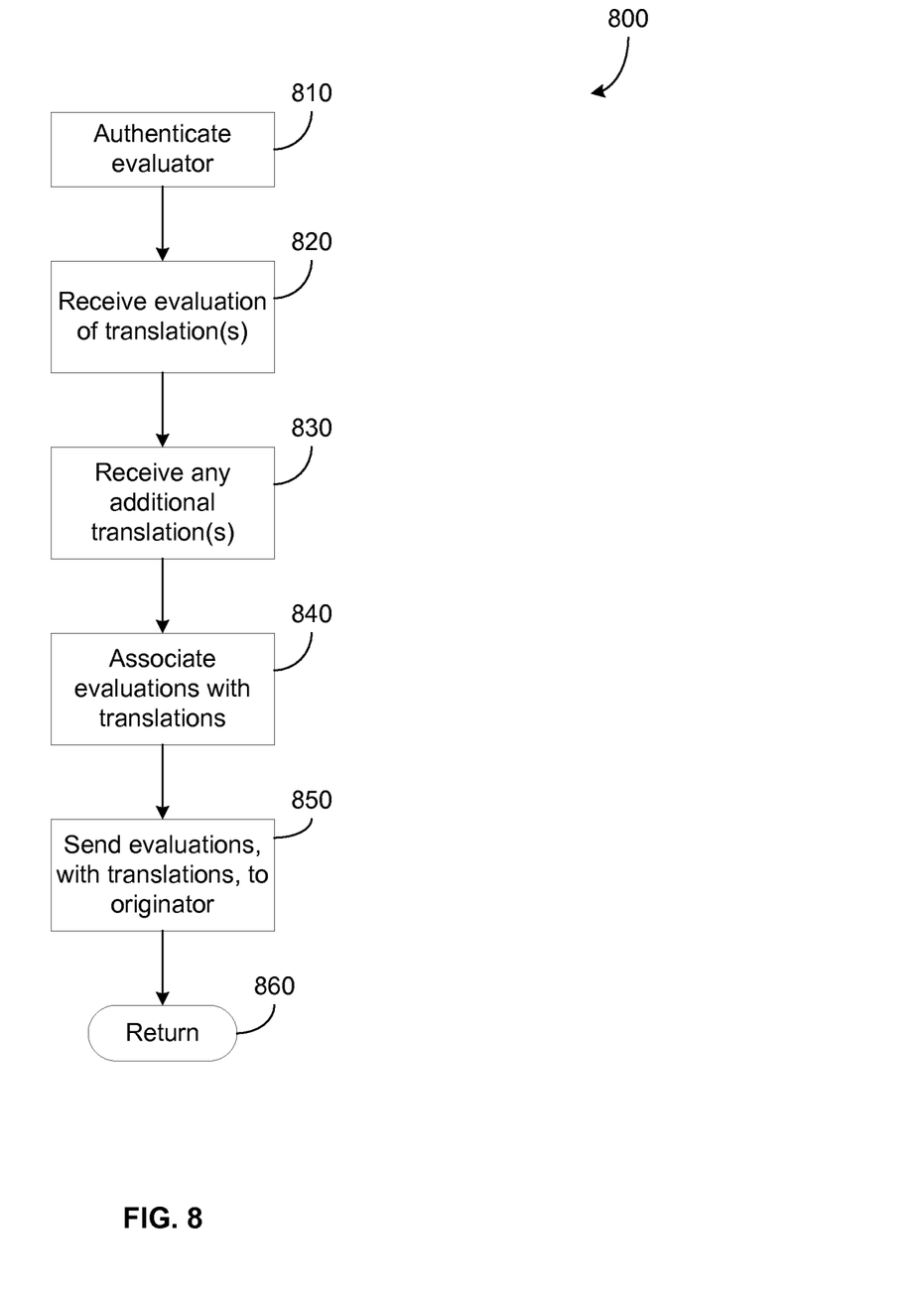
FIG. 8 is a flowchart illustrating the processing of third party evaluations of translations, according to an embodiment.

The processing for such an embodiment at the server is illustrated in FIG. 8, according to an embodiment. At 810, the server may authenticate a prospective evaluator. This may include password authentication and/or verification of a digital signature presented by the evaluator. Such a signature may be, for example, based on public key or symmetric key technology. After the evaluator has accessed and evaluated the translations related to a particular translation request, the evaluations may be received at 820. At 830, additional translations may be received, if any. At 840, these received evaluations may be associated with one or more particular translation requests. At 850, the evaluations may be sent to the originator, along with the actual translations. The process may conclude at 860.

Figure 9:
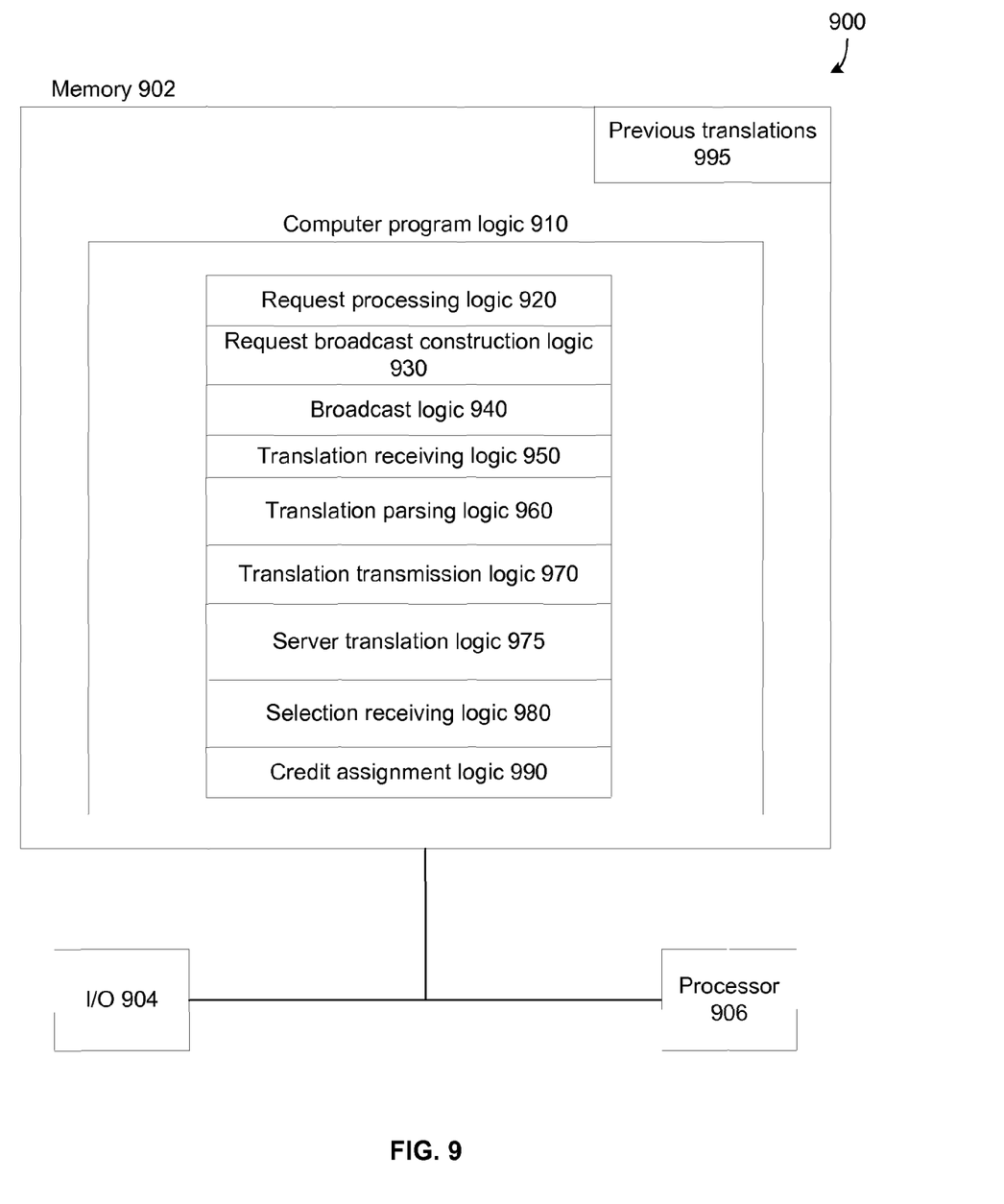
FIG. 9 is a block diagram illustrating software components in the server, according to an embodiment.

FIG. 9 illustrates a software or firmware embodiment of the logic of FIGS. 6 and 7. System 900 may be incorporated in a server, such as the language translation request processing server 130 of FIGS. 1 and 3 for example. System 900 may include but is not limited to one or more memory components 902 in communication with a processor 906 and one or more input/output devices or ports, shown collectively as I/O 904.

Memory 902 may store instructions for execution by processor 906, along with additional related data. Memory 902 may be implemented on a computer readable medium, as would be understood to a person of ordinary skill in the art.

Such a medium may be, for example and without limitation, a non-volatile memory device, a hard drive, a compact disk that may be read by a compact disk drive, an integrated circuit, or other machine-readable memory device.

The executable instructions are shown as computer program logic 910. Computer program logic 910 may include several modules, shown as modules 920-990, but is not limited to these modules. These include request processing logic 920. This module may be responsible for receiving a translation request and performing the processing described above with respect to references 610, 615, and FIG. 7, e.g., receiving, authentication, and parsing of the translation request, and recording of related administrative data.

Request broadcast construction logic 930 may be responsible for constructing the request broadcast on the basis of the translation request. Broadcast logic 940 may be responsible for determining the prospective translators to solicit and for sending the broadcast to them. As discussed above, the translators may have been predetermined and their identities stored at the server, or determined upon receipt of the translation request. These identities may have been determined by searching the originator's contacts on social networking services. Alternatively, the originator may identify the translators in the translation request.

Translation receiving logic 950 may be responsible for receiving the translations at the server. After receiving the translations, translation parsing logic 960 may parse the translations as discussed above. Translations that are not rejected in the parsing process may then be forwarded to the originator by translation transmission logic 970.

Selection receiving logic 980 may be responsible for receiving an identifier for the translation selected by the originator. Credit assignment logic 990 may be responsible for issuing credit to the translator that created the chosen translation.

In the illustrated embodiment, memory 902 may also include storage for previous translations 995. These translations may represent a digital dictionary that allows the server to perform automated translation of translation requests, or otherwise makes available previously requested translations of the passage in question. Such a lookup or translation may be performed at the server using server translation logic 975. Alternatively, the previous translations 995 may reside in a different memory component or medium other than memory 902.

Figure 10:
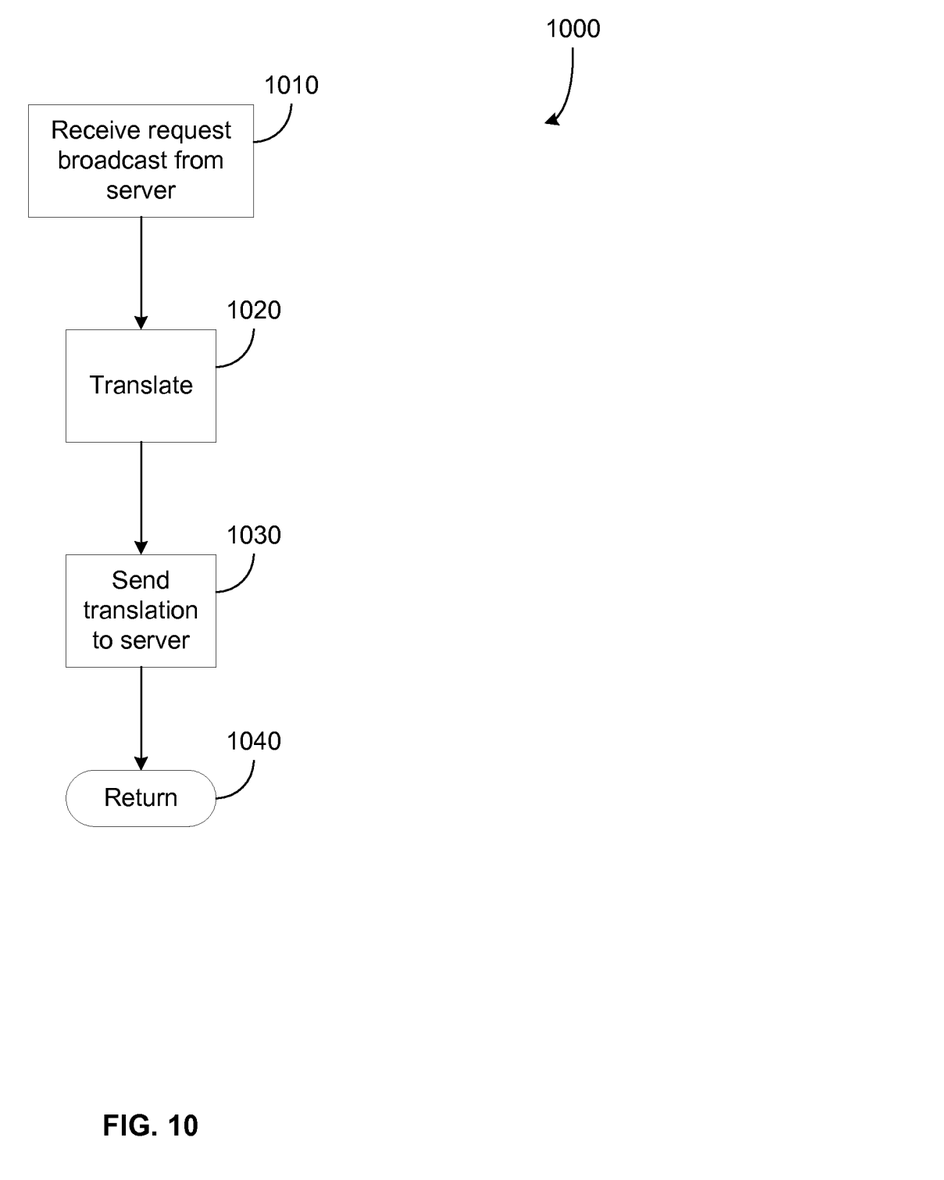
FIG. 10 is a flowchart illustrating processing at a translator, according to an embodiment.

FIG. 10 illustrates the processing 1000 performed by the translator, according to an embodiment. At 1010, the request broadcast is received at the translator's communications device from the server. At 1020, the translation may be performed. At 1030, the translation created at 1020 is sent to the server. The process may conclude at 1040.

In an embodiment, the translator's communications device may be used in process 1000. In particular, the request broadcast may be received through such a device, and the translation may be sent to the server via the computing device. Moreover, the device may be a mobile communications device. The functionality for supporting a translator may be incorporated in a communications device along with functionality that supports an originator. In this case, the device may be used by a person acting as an originator or as a translator. Such an embodiment is illustrated in FIG. 5. While the functionality shown in this figure is implemented in software or firmware, this functionality may also be implemented in hardware, or in a combination of software, firmware, or hardware.

Computer program logic 508 may include a translation response UI 520 to receive inputs from and convey information to the translator. The broadcast receiver module 550 may serve to receive the request broadcast from the server. The translation UI 560 may allow the translator to access the text or audio to be translated, and to accept the translation from the translator.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   receiving, at a server, a translation request that has been originated using a communications device using a template in an application running on the communications device;
   sending, from the server to a plurality of translators, a request broadcast, based on the translation request;
   receiving from the plurality of translators, at the server, a plurality of respective translations responsive to the broadcast;
   parsing the plurality of translations at the server to detect any abusive or offensive language;
   forwarding the translations from the server to the communications device of an originator of the translation request; and
   receiving, at the server, an identity of a translation that has been chosen by the originator from among the plurality of translations.

2. The method of claim 1, wherein the translation request comprises a form filled out by the originator.

3. The method of claim 1, wherein the translation request is received as one or more short message service (SMS) messages.

4. The method of claim 1, further comprising:
   authenticating the received translation request at the server, performed prior to said sending of the request broadcast.

5. The method of claim 1, further comprising:
   parsing the translation request at the server, performed prior to said sending of the request broadcast.

6. The method of claim 1, wherein the translation request is received from the communications device of the originator.

7. The method of claim 1, further comprising:
   awarding a translator of the identified translation with credit that is usable by the translator in a subsequent transaction.

8. The method of claim 1, wherein each of the translations include audio data representing the translation.

9. A system, comprising:
   a processor;
   request processing logic in communication with the processor and configured to direct said processor to receive a translation request that has been originated using a communications device using a template in an application running on the communications device;
   broadcast logic in communication with the processor and configured to direct said processor to send, to a plurality of translators, a request broadcast based on the translation request;
   translation receiving logic in communication with the processor and configured to direct said processor to receive from the translators a plurality of respective translations responsive to the broadcast;

translation parsing logic in communication with the processor and configured to direct said processor to parse the plurality of translations to detect any abusive or offensive language;

translation transmission logic in communication with the processor and configured to direct said processor to forward the translations to an originator of the translation request; and selection receiving logic in communication with the processor and configured to direct said processor to receive an identity of a translation that has been chosen by the originator from among the plurality of translations.

10. The system of claim 9, wherein the translation request is received as one or more short message service (SMS) messages.

11. The system of claim 9, wherein said request processing logic is further configured to direct said processor to:
authenticate the received translation request, prior to sending said request broadcast.

12. The system of claim 9, wherein said request processing logic is further configured to direct said processor to:
parse the translation request, prior to sending said request broadcast.

13. The system of claim 9, wherein said executable logic further comprises:
credit assignment logic configured to direct said processor to award credit to a translator associated with the translation that was chosen by the originator from among said translations, wherein said credit is usable by the translator in a subsequent transaction.

14. The system of claim 9, wherein said memory is further configured to store previously translated words that may be accessed by said originator.

15. A system, comprising:
a processor;
translation request user interface logic in communication with said processor and configured to direct said processor to send a translation request to a server wherein the request has been originated using a communications device using a template in an application running on the communications device;
translation receiver logic in communication with said processor and configured to direct said processor to receive two or more translations from the server and to present said translations to the communications device of an originator of the translation request, said translations having been parsed by the server to detect abusive or offensive language; and
translation response user interface logic in communication with said processor and configured to direct said processor to receive from said originator an indication of the best translation that has been chosen by said originator from among said translations and to convey to the server the identity of the best translation that has been chosen by said originator.

16. The system of claim 15, wherein said translation request is in the form of one or more short messaging service (SMS) messages.

17. The system of claim 15, wherein said translations are received from said server as one or more multi-media messaging service (MMS) messages.

18. The system of claim 15, wherein said translations each comprise audio data representing the translation.

19. The system of claim 15, wherein said originator is connected to translators that produce said translations via a social networking service.

20. A computer program product including a non-transitory computer readable medium having computer program logic stored thereon, the computer program logic including:
logic to cause a processor to send a translation request to a server, wherein the request has been originated using a communications device using a template in an application running on the communications device;
logic to cause the processor to receive two or more translations from the server, said translations having been parsed by the server to detect abusive or offensive language;
logic to cause the processor to present said translations to the communications device of an originator of the translation request; and
logic to cause the processor to receive from said originator an indication of the best translation that has been chosen by said originator from among said translations and to convey to the server the identity of the best translation that has been chosen by said originator.

21. The computer program product of claim 20, wherein said translation request is received as one or more short messaging service (SMS) messages.

22. The computer program product of claim 20, wherein said translations are received from said server as one or more multi-media messaging system (MMS) messages.

23. The computer program product of claim 20, wherein said translations each comprise audio data representing the translation.

24. The computer program product of claim 20, wherein the computer program logic further comprises:
logic to send to the server a digital signature corresponding to the system, prior to receiving said translations.

* * * * *